United States Patent [19]

Czarka

[11] Patent Number: 4,857,033
[45] Date of Patent: Aug. 15, 1989

[54] CLUTCH ASSEMBLY WITH COMBINED VARIABLE AND FIXED SPEED PULLEYS

[75] Inventor: Michael W. Czarka, Mount Pleasant, Mich.

[73] Assignee: Dana Corporation, Toledo, Ohio

[21] Appl. No.: 51,190

[22] Filed: May 14, 1987

Related U.S. Application Data

[63] Continuation of Ser. No. 812,820, Dec. 23, 1985, abandoned.

[51] Int. Cl.⁴ .............................................. F16H 11/06
[52] U.S. Cl. ........................................ 474/14; 474/33
[58] Field of Search ................................... 474/12, 14

[56] References Cited

U.S. PATENT DOCUMENTS

| | | | |
|---|---|---|---|
| 2,641,981 | 6/1953 | Pilsner | 474/33 X |
| 2,759,581 | 8/1956 | Jacobs | 192/93 A X |
| 3,015,237 | 1/1962 | Musgrave | 474/33 |
| 3,127,969 | 4/1964 | Hansen | 192/93 A |
| 3,129,797 | 4/1964 | Orcutt et al. | 192/93 A X |
| 3,230,787 | 1/1966 | Siegal | 474/33 X |
| 3,386,545 | 6/1968 | Hansen | 192/93 A X |
| 3,608,387 | 9/1971 | Fox | 474/14 |
| 4,027,544 | 6/1977 | Kobayashi | 474/14 |
| 4,617,005 | 10/1986 | Jaccod et al. | 474/14 |

Primary Examiner—Carl D. Friedman
Attorney, Agent, or Firm—MacMillan, Sobanski & Todd

[57] ABSTRACT

The present invention relates to a clutch and a pulley assembly which provides a unique arrangement for mounting a clutch mechanism, a fixed pulley, and a variable speed pulley about a common mounting hub. More specifically, the invention includes an axially extending mounting hub adapted to be coupled to a rotatable drive shaft. A fixed speed pulley is rotatably mounted on the hub and is adapted to be coupled to a first belt for driving a first external device. A variable speed pulley is rotatably mounted on the hub and it is adapted to be coupled to a second belt for driving a second external device. The fixed and variable speed pulleys are coupled together to prevent rotation of the pulleys relative to one another. A clutch mechanism is mounted on the hub for selectively locking the hub to the fixed and variable speed pulleys. The clutch is shiftable between a released position wherein the pulleys can rotate relative to the hub and an engaged position wherein the clutch resists relative rotational movement between the hub and the pulleys.

5 Claims, 2 Drawing Sheets

CLUTCH ASSEMBLY WITH COMBINED VARIABLE AND FIXED SPEED PULLEYS

This application is a continuation of application Ser. No. 812,820, filed Dec. 23, 1985, now abandoned.

BACKGROUND OF THE INVENTION

The present invention relates in general to the combination of a mechanical clutch and pulley assembly and, in particular, to an assembly wherein the clutch mechanism and the associated drive pulleys are mounted about a common hub member.

It is often desirable to provide a clutch mechanism for controlling the application of power from a rotating drive shaft to an associated driven device. For example, U.S. Pat. No. 3,127,969 to Hansen discloses a clutch and pulley assembly wherein a mechanically operated clutch is mounted about a rotatable support member which can be fixed to an associated rotatable shaft. The Hansen patent discloses the use of two fixed speed pulleys which are also mounted about the rotatable support member.

Variable speed pulley drive mechanisms for use as a transmission mechanism in powering devices such as vehicles, lawn mowers, pumps and the like, wherein the torque demand can vary suddenly, are well known. One such variable speed drive mechanism is disclosed in U.S. Pat. No. 3,015,237 to Musgrave. This patent discloses a variable speed pulley wherein the spacing between a pair of cooperating inclined pulley engaging surfaces can be varied by changing the tension on the associated belt, thereby changing the effective diameter of the pulley and causing the belt speed to vary. Another variable speed pulley mechanism is disclosed in U.S. Pat. No. 3,269,201 issued to O. L. Looker.

SUMMARY OF THE INVENTION

The present invention relates to a unique clutch and pulley assembly adapted to be driven by a rotatable drive shaft and to drive at least two external devices. The assembly includes a single, axially extending mounting hub adapted to be coupled to and driven by a rotatable drive shaft. A first fixed speed pulley means is rotatably mounted on the hub and is adapted to be coupled to a first belt means for driving a first external device.

A second variable speed pulley means is rotatably mounted on the hub and is adapted to be coupled to a second belt means for driving a second external device. The second pulley means includes a first disc member having a first inclined belt engaging surface and a second disc member having a second inclined belt engaging surface in facing relationship with the first surface. Means are provided for permitting axial movement of the second disc member relative to the first disc member to vary the spacing between the first and second inclined surfaces, thereby causing the belt means to engage different portions of the inclined surfaces and varying the speed thereof. Also, means are provided for preventing rotational movement of the first disc member relative to the second disc member and for preventing relative rotation of the first pulley means relative to the second pulley means.

Further, the present invention includes a clutch means mounted on the hub for selectively locking the hub to the first and second pulley means. The clutch means is shiftable between a released position wherein the first and second pulley means can rotate relative to the hub and an engaged position wherein the clutch means resists relative rotation movement between the hub and the first and second pulley means.

DESCRIPTION OF THE PREFERRED EMBODIMENT

Figure 1:
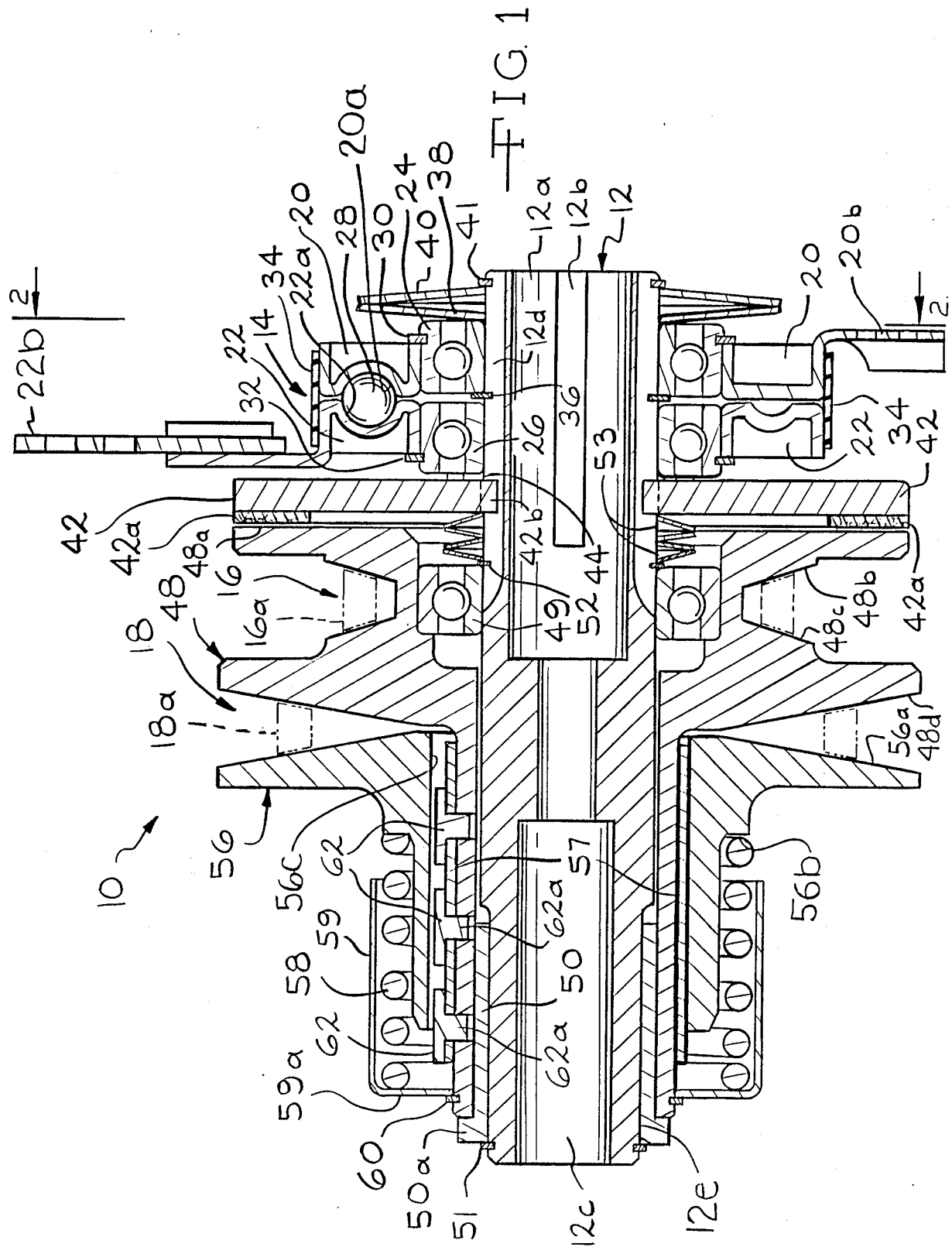
FIG. 1 is a sectional view of the clutch and pulley assembly embodying the features of the present invention taken along the line 1—1 of FIG. 2.

Referring to FIG. 1, there is shown a clutch and pulley assembly 10 embodying the features of the present invention. Basically, the invention concerns the use of a single mounting hub 12 for supporting a clutch mechanism 14, a fixed speed pulley 16, and a variable speed pulley 18. The hub 12 is adapted to be driven by a rotatable shaft (not shown), while the clutch mechanism is operated to control the application of power to at least two external devices (not shown) by drive belts 16a and 18a through pulleys 16 and 18.

One end of the hub 12 is provided with a cylindrical opening 12a for receiving a rotatable drive shaft (not shown). An axially extending keyway 12b is formed on the inner wall of the opening 12a and cooperates with a corresponding keyway formed in the drive shaft for receiving a key (not shown) to securely couple the rotatable drive shaft to the hub 12. The opposite end of the hub 12 is provided with a cylindrical opening 12which can be coupled to drive an associated driven shaft (not shown) directly through the hub member.

The clutch mechanism 14 is generally of the type disclosed in U.S. Pat. No. 3,127,969 to Hansen which is herein incorporated by reference, and is of the type manufactured and sold by Dana Corporation of Toledo, Ohio under the trademark ROTO-CAM. The clutch assembly 14 includes first and second cooperating annular cam members 20 and 22 rotatably mounted about the hub 12 by bearing assemblies 24 and 26 respectively. A plurality of circumferentially spaced balls 28 are interposed between arcuately shaped cam surfaces 20a and 22a provided on the facing surfaces of the cam members 20 and 22. As discussed in more detail in the above-mentioned Hansen patent, when the members 20 and 22 are rotated relative to one another, the engagement of the camming surfaces 20a and 22a with the balls 28 causes the members 20 and 22 to move axially away from one another. As will be discussed, the resultant relative axial movement between the cam members provides the necessary movement for the engagement and disengagement of the clutch.

The annular cam members 20 and 22 having the balls 28 located therebetween are maintained about the periphery of the bearings 24 and 26 by means of snap rings 30 and 32 located within outer annular grooves formed in the outer races of the bearings 24 and 26 respectively. A garter-type neoprene sealing band 34 surround the camming members 20 and 22. When the clutch is in its disengaged position as shown in FIG. 1, the bearing 24 is biased against a snap ring 36 secured to the hub 12 by means of a pair of cooperating Bellville spring washers 38 and 40. The outer annular peripheral portions of the spring washers 38 and 40 contact one another, while the inner peripheral portion of the spring washer 38 contacts the inner race of the bearing 24 and inner periphery of the washer 40 contacts a snap ring 41 mounted in the extreme one end of the hub 12.

A friction plate 42 having a friction ring 42a bonded thereon surrounds the hub 12. The plate 42 is provided with radially inwarding extending teeth 42b which are received within circumferentially spaced, longitudinally extending grooves 12d formed in the one end of the hub 12 to prevent rotation of the plate 42 relative to the hub 12. A spacer ring 44 surrounds the hub 12 and is positioned between the friction plate and the inner race of the bearing 26.

When the clutch is engaged, the friction ring 42a of the friction plate 42 will engage a flat surface 48a of a disc member 48. The disc member 48 is rotatably mounted about the hub 12 at its inner end by means of a bearing assembly 49 and is supported at its outer end by a bushing 50 positioned about a reduced diameter end portion 12e of the hub 12. The bushing 50 is maintained on the hub by means of a snap ring 51 secured to the hub, while the disc member 48 is maintained on the hub by means of an annular shoulder 50a formed on the outer end of the bushing 50. A snap ring 52 seated in the hub 12 adjacent the bearing 49 limits inward axial movement of the disc member 48. A plurality of Bellville spring washers 53 surround the hub 12 and are located between the snap ring 52 and the friction plate 42 for biasing the plate 42 away from the disc surface 48a and against the spacer ring 44 when the clutch is disengaged.

The disc member 48 is provided with inclined surfaces 48b and 48c which cooperate to define a groove defining the fixed speed pulley 16. The disc member 48 also includes an inclined surface 48d which cooperates with an inclined surface 56a of an axially moveable disc member 56 for defining the variable speed pulley 18. The variable speed pulley 18 can be of the type manufactured by Dana under the trademark VARA-CONE. A bushing 57 is coaxially positioned between the disc member 48 and the disc member 56 to permit relative axial movement therebetween.

Normally, the disc member 56 is spring biased toward the disc member 48 by means of a helical coil spring 58 having one end seated against an annular shoulder 56b formed on the disc member 56 and an opposite end engaging the inner surface of an end wall 59a of a cylindrical spring cover 59. The cover 59 is secured about the disc member 48 by means of a snap ring 60 positioned in a groove at the outer end of the disc member 48.

Rotative movement of the disc member 56 relative to the disc member 48 is prevented by three axially spaced apart keys 62 positioned in a longitudinally extending slot 56c formed in the disc member 56 and having radially inwardly projecting portions 62a which extend through aligned apertures formed in the bushing 57 and the disc member 48.

The distance between the cooperating inclined surfaces 56a and 48d, and thus the speed at which the drive belt 18a located therebetween is driven, is controlled by varying the tension on the associated drive belt. As the tension on the drive belt is increased, the disc member 56 will be urged axially outwardly to compress the helical spring 58 and move the surfaces 56a and 48d away from one another. This causes the belt 18a to be located closer to the axis of rotation and thus reduces the speed of the belt.

Figure 2:
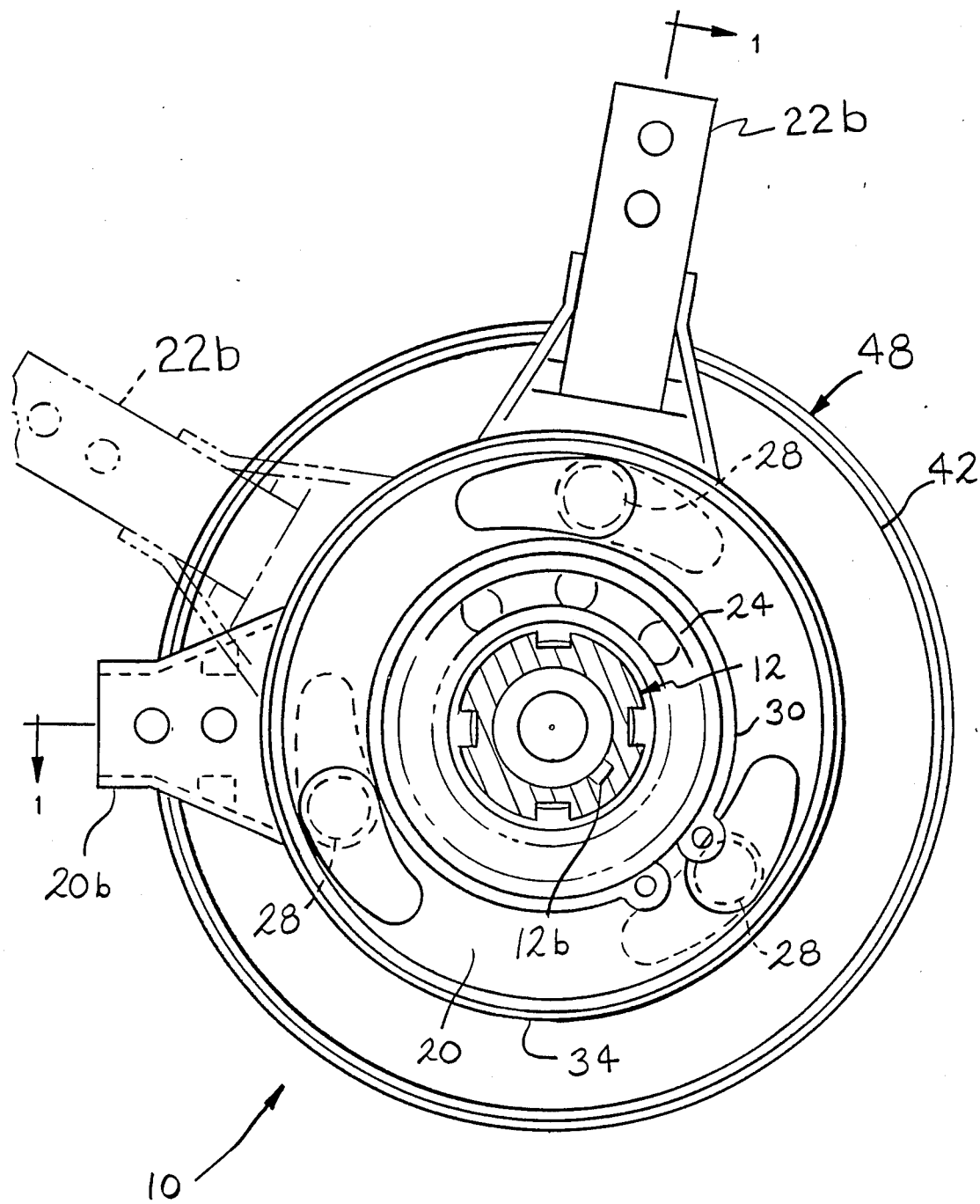
FIG. 2 is a sectional view of the clutch and pulley assembly taken along the line 2—2 of FIG. 1.

The engagement and disengagement of the clutch mechanism is controlled by a pair of actuating arm members. More specifically, the cam member 20 includes an arm 20b which is typically fixed to an associated support member (not shown), while the cam member 22 includes an actuating arm 22b which is coupled to mechanical linkage (not shown) for controlling the rotative position of the cam member 22 relative to the cam member 20. When the actuating arm 22b is in the solid line position as shown in FIGS. 1 and 2, the cam members 20 and 22 will be adjacent one another as shown in FIG. 1, and, the friction ring 42a is spaced from the disc surface 48a by means of the Bellville spring washers 53. When the actuating arm 22b is rotated to the phantom position shown in FIG. 2, the cam members 20 and 22 will be urged away from one another such that the friction plate will contact the disc member 48 and the bearing 24 will move axially away from the snap ring 36. This causes the friction plate 42 to be urged against the disc member 48 by a force determined by the Bellville spring washers 38 and 40.

It will be appreciated that the clutch and pulley arrangement of the present invention provides a unique approach for combining a clutch mechanism, a fixed speed pulley unit, and a variable speed pulley unit about a common mounting hub. Thus, such a structure can be manufactured as a complete clutch and pulley unit which can then be readily attached as a complete assembly to an associated drive shaft.

It should be noted that, while the present invention has been illustrated and described in what is considered to represent its preferred embodiment, it will be appreciated that the present invention can be practiced otherwise than as specifically illustrated and described without departing from the spirit or scope of the attached claims.

What is claimed is:

1. A clutch and pulley assembly adapted to be driven by a rotatable drive shaft and the drive at least two external devices, said assembly comprising:
    an axially extending mounting hub having one end provided with an opening for receiving one end of the rotatable drive shaft;
    means for securing said hub relative to the drive shaft;
    a first fixed speed pulley means rotatably mounted on said hub and adapted to be coupled to a first belt means for driving a first external device;
    a second variable speed pulley means rotatably mounted on said hub and adapted to be coupled to a second belt means for driving a second external device, said second pulley means including a first disc member having a first inclined belt engaging surface and a second disc member having a second inclined belt engaging surface in facing relationship with said first surface, means for permitting axial movement of said second disc member relative to said first disc member to vary the spacing between said first and second inclined surfaces, and means for preventing rotational movement of said first disc member relative to said second disc member;
    means for preventing relative rotation of said first pulley means relative to said second pulley means;
    retaining means independent of said securing means for mounting said first pulley means and said second pulley means on said hub means;
    said retaining means including bushing means positioned between an opposite end of said hub and said first disc member for rotatably supporting said first disc member on said hub, said retaining means including means secured to the opposite end of said hub for preventing axial movement of said bushing means outwardly off said hub, said retaining means including means for engaging an outer end surface of said first disc member for preventing outer axial movement of said first disc member off said bushing means; and clutch means mounted on said hub for selectively locking said hub to said first and second pulley means, said clutch means shiftable between a released position wherein said first and second pulley means can rotate relative to said hub and an engaged position wherein said clutch means resists relative rotational movement between said hub and said first and second pulley means.

2. The clutch and pulley assembly according to claim 1 wherein said first disc member includes a reduced diameter portion extending axially along said hub, and said second disc member is mounted for relative axial movement along said reduced diameter portion.

3. The clutch and pulley assembly according to claim 1 wherein said first disc member includes a clutch engaging surface, and said clutch means includes a friction plate having means for preventing rotative movement of said plate about said hub, and means for selectively moving said plate between said released position wherein said plate is spaced from said clutch engaging surface and said engaged position wherein said plate contacts said clutch engaging surface.

4. The clutch and pulley assembly according to claim 1 wherein said first disc member includes third and fourth belt engaging surfaces in fixed, spaced apart facing relationship for defining said first fixed pulley means.

5. The clutch and pulley assembly according to claim 1 including means for biasing said second belt engaging surface of said second disc member toward said first belt engaging surface of said first disc member.

* * * * *

UNITED STATES PATENT AND TRADEMARK OFFICE
CERTIFICATE OF CORRECTION

PATENT NO. : 4,857,033

DATED : August 15, 1989

INVENTOR(S) : Michael W. Czarka

It is certified that error appears in the above-identified patent and that said Letters Patent is hereby corrected as shown below:

Claim 1, line 37, after and delete "the" and insert -- to --.

Signed and Sealed this

Third Day of July, 1990

Attest:

HARRY F. MANBECK, JR.

Attesting Officer  Commissioner of Patents and Trademarks